US008949973B2

(12) United States Patent
Nagata

(10) Patent No.: US 8,949,973 B2
(45) Date of Patent: Feb. 3, 2015

(54) IMAGE PROCESSING APPARATUS

(75) Inventor: Akiko Nagata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1522 days.

(21) Appl. No.: 12/079,541

(22) Filed: Mar. 27, 2008

(65) Prior Publication Data

US 2008/0250494 A1    Oct. 9, 2008

(30) Foreign Application Priority Data

Apr. 4, 2007   (JP) ................. 2007-098376

(51) Int. Cl.
*H04L 9/32* (2006.01)
*H04L 29/06* (2006.01)
*G06F 21/34* (2013.01)
*G06F 21/82* (2013.01)
*H04N 1/00* (2006.01)
*H04N 1/44* (2006.01)

(52) U.S. Cl.
CPC .............. *H04L 63/083* (2013.01); *G06F 21/34* (2013.01); *G06F 21/82* (2013.01); *H04N 1/00204* (2013.01); *H04N 1/00514* (2013.01); *H04N 1/4433* (2013.01); *G06F 2221/2149* (2013.01); *H04N 1/4413* (2013.01); *H04N 2201/0039* (2013.01); *H04N 2201/0094* (2013.01)
USPC ........................................................ 726/19

(58) Field of Classification Search
CPC ....... G06F 21/31; G06F 21/575; G06F 21/83; G06F 21/34; G06F 21/36
USPC ........................................................ 726/19
See application file for complete search history.

(56) References Cited

U.S. PATENT DOCUMENTS

| 6,232,968 | B1* | 5/2001 | Alimpich et al. | 715/744 |
|---|---|---|---|---|
| 6,862,583 | B1* | 3/2005 | Mazzagatte et al. | 705/64 |
| 7,474,862 | B2* | 1/2009 | Shouno | 399/80 |
| 7,581,243 | B2* | 8/2009 | Shigeeda | 726/3 |
| 7,609,402 | B2* | 10/2009 | Chang et al. | 358/1.15 |
| 7,688,466 | B2* | 3/2010 | Manchester | 358/1.15 |
| 7,730,526 | B2* | 6/2010 | Lamplough | 726/9 |
| 2002/0062453 | A1* | 5/2002 | Koga | 713/202 |
| 2002/0083114 | A1* | 6/2002 | Mazzagatte et al. | 709/100 |

(Continued)

FOREIGN PATENT DOCUMENTS

| CN | 1874406 | 12/2006 |
|---|---|---|
| JP | 2004-289302 | 10/2004 |

(Continued)

*Primary Examiner* — Jason K. Gee
*Assistant Examiner* — Sanchit Sarker
(74) *Attorney, Agent, or Firm* — Edwards Wildman Palmer LLP; David G. Conlin; Steven M. Jensen

(57) ABSTRACT

An image processing apparatus is provided that is capable of displaying a customized screen without requiring direct input operations to the image processing apparatus. The image processing apparatus (for example, a multi-function peripheral, or MFP) is communicably connected to an information processing apparatus (for example, a personal computer, or PC) and includes a displaying portion. The MFP acquires user information related to a login user who logs in to the PC, authenticates based on the acquired user information to determine whether the login user is a usage permitted user who is permitted to use the MFP, and displays a customized screen corresponding to the login user on the displaying portion of the MFP when the login user is authenticated as the usage permitted user.

11 Claims, 12 Drawing Sheets

(56) References Cited

U.S. PATENT DOCUMENTS

| | | | |
|---|---|---|---|
| 2004/0169598 A1* | 9/2004 | Arling et al. | 341/173 |
| 2004/0174398 A1* | 9/2004 | Luke et al. | 345/856 |
| 2004/0216058 A1* | 10/2004 | Chavers et al. | 715/810 |
| 2005/0114767 A1* | 5/2005 | Sato | 715/527 |
| 2005/0210253 A1* | 9/2005 | Shigeeda | 713/171 |
| 2005/0254086 A1* | 11/2005 | Shouno | 358/1.15 |
| 2006/0050309 A1* | 3/2006 | Someya | 358/1.15 |
| 2006/0203278 A1* | 9/2006 | Makishima | 358/1.14 |
| 2006/0221363 A1* | 10/2006 | Roth et al. | 358/1.6 |
| 2006/0274358 A1* | 12/2006 | Fukui et al. | 358/1.15 |
| 2006/0277599 A1* | 12/2006 | Lamplough | 726/5 |
| 2006/0279768 A1* | 12/2006 | Wang et al. | 358/1.15 |
| 2007/0013962 A1* | 1/2007 | Hayashi | 358/403 |
| 2007/0083752 A1* | 4/2007 | Kanou et al. | 713/156 |
| 2007/0136820 A1 | 6/2007 | Saito | |
| 2007/0171436 A1* | 7/2007 | Manchester | 358/1.1 |
| 2007/0206088 A1* | 9/2007 | Mizunashi et al. | 348/14.01 |
| 2007/0216965 A1* | 9/2007 | Yoshihama | 358/474 |
| 2007/0242282 A1* | 10/2007 | Hashimoto | 358/1.2 |
| 2007/0257889 A1* | 11/2007 | Croy | 345/170 |
| 2007/0280459 A1* | 12/2007 | Yee et al. | 379/201.01 |
| 2008/0010600 A1* | 1/2008 | Katano | 715/748 |
| 2008/0043274 A1* | 2/2008 | Wang et al. | 358/1.14 |
| 2008/0043278 A1* | 2/2008 | Suzuki | 358/1.15 |
| 2008/0049651 A1* | 2/2008 | Chang et al. | 370/310 |
| 2008/0072052 A1* | 3/2008 | Suzuki | 713/176 |
| 2008/0204470 A1* | 8/2008 | Kato | 345/593 |

FOREIGN PATENT DOCUMENTS

| | | |
|---|---|---|
| JP | 2006-146415 | 6/2006 |
| JP | 2006-256118 | 9/2006 |
| JP | 2006-339946 | 12/2006 |
| JP | 2007-055099 | 3/2007 |
| JP | 2007-079857 | 3/2007 |

* cited by examiner

FIG. 12A

Table 1100:

| APPLICATION | PARAMETER 1 | PARAMETER 2 | DISPLAY INFORMATION 1 | DISPLAY INFORMATION 2 | DISPLAY INFORMATION 3 |
|---|---|---|---|---|---|
| REMOTE CONFERENCE | OTHER PARTY | CONFERENCE MEMBER ID | SCAN TO OTHER PARTY | SCAN TO Email FOR CONFERENCE MEMBER | PRINT OUT TO OTHER PARTY MFP |
| FILING APPLICATION | NULL | NULL | HIGH-RESOLUTION SCAN TO DISPLAY | HIGH-SPEED SCAN TO DISPLAY | ... |
| PRESENTATION APPLICATION | NULL | NULL | OUTPUT DISPLAY CONTENTS ONTO PAPER | ... | ... |
| ... | ... | ... | ... | ... | ... |

FIG. 12B

Table 1200:

| A PLURALITY OF APPLICATION | PARAMETER 1 | PARAMETER 2 | DISPLAY INFORMATION 1 | DISPLAY INFORMATION 2 | DISPLAY INFORMATION 3 |
|---|---|---|---|---|---|
| REMOTE CONFERENCE AND WORD APPLICATION | OTHER PARTY | CONFERENCE MEMBER ID | SCAN TO OTHER PARTY | SCAN TO Email FOR CONFERENCE MEMBER | PRINT OUT DOCUMENT CREATED WITH WORD APPLICATION TO OTHER PARTY MFP |
| ... | ... | ... | ... | ... | ... |

IMAGE PROCESSING APPARATUS

CROSS-NOTING PARAGRAPH

This Nonprovisional application claims priority under 35 U.S.C. §119(a) on Patent Application No. 2007-098376 filed in JAPAN on Apr. 4, 2007, the entire contents of which are hereby incorporated herein by references.

FIELD OF THE INVENTION

The present invention relates to an image processing apparatus, particularly, to an image processing apparatus that displays a customized screen for each user.

BACKGROUND OF THE INVENTION

Recently, a multi-function peripheral (MFP) is used that includes a copy function, a scanner function, etc., along with a printer function as an image processing apparatus. Generally, in the case of a multi-function peripheral, one multi-function peripheral is often used by a plurality of persons. That is, one multi-function peripheral is often used as a shared machine. In consideration of the operationality and operational habits of individuals (users) utilizing the multi-function peripheral, it is required to display operation screens in a state suitable for the users.

Therefore, conceptually, an operation screen (customized screen) customized for each user identified for registration based on personal information may be displayed on an operation panel of the multi-function peripheral.

For example, an image processing apparatus disclosed in Japanese Laid-Open Patent Publication No. 2007-055099 includes a user authenticating means that reads user identification information to perform user authentication and reads customized information including image data of a customized screen for the user registered in advance based on the user identification information to display the customized screen of the user on a displaying portion. In the image processing apparatus disclosed in Japanese Laid-Open Patent Publication No. 2007-055099, the operationality of the image processing apparatus is improved by displaying the customized screen for the user after the user authentication with the above configuration.

However, in the image processing apparatus, etc., disclosed in Japanese Laid-Open Patent Publication No. 2007-055099, the function of displaying the customized screen of the user is based on the user identification information input to the image processing apparatus by users in some way. That is, in a conventional image processing apparatus, the operation for the image processing apparatus is required to display the customized screen of the user, and the operation becomes cumbersome.

An image processing apparatus is often configured to operate in conjunction with an information processing apparatus such as a personal computer (PC). Particularly, in this case, when a user doing work with an information processing apparatus prepares a document, etc., necessary for the work through a customized screen of the image processing apparatus and the image processing apparatus, since the user must input the user identification information to the image processing apparatus in the case of the conventional image processing apparatus, the operation becomes cumbersome and a long time was required for the work.

SUMMARY OF THE INVENTION

It is therefore the object of the present invention to provide an image processing apparatus capable of displaying a customized screen without input operations to the image processing apparatus.

Another object of the present invention is to provide an image processing apparatus communicably connected to an information processing apparatus and comprising a displaying portion, the image processing apparatus acquiring user information related to a login user who logs in to the information processing apparatus, the image processing apparatus authenticating based on the acquired user information whether the login user is a usage permitted user who is permitted to use the image processing apparatus, and when it is authenticated that the login user is the usage permitted user, the image processing apparatus displaying a customized screen corresponding to the login user on the displaying portion.

Another object of the present invention is to provide the image processing apparatus, wherein the image processing apparatus is communicably connected to an external authentication server that authenticates whether the login user is the usage permitted user, and wherein the image processing apparatus transmits the acquired user information to the external authentication server, receives from the external authentication server an authentication result of whether the login user is the usage permitted user, and performs the authentication based on the acquired user information on the basis of the received authentication result.

Another object of the present invention is to provide the image processing apparatus, wherein the image processing apparatus has a user authentication information table listing user authentication information and refers to the user authentication information table to perform the authentication based on the acquired user information.

Another object of the present invention is to provide the image processing apparatus, wherein the user authentication information table lists an e-mail address for each user.

Another object of the present invention is to provide the image processing apparatus, wherein the user authentication information table lists display information for displaying a customized screen for each user.

Another object of the present invention is to provide the image processing apparatus, wherein it is determined whether the login user logs out from the information processing apparatus and wherein if it is determined that the login user logs out from the information processing apparatus, the image processing apparatus puts itself into a logout state to display a default screen on the displaying portion.

Another object of the present invention is to provide the image processing apparatus, wherein the image processing apparatus acquires activated-application information related to application software activated on the information processing apparatus and displays on the displaying portion an application-related screen related to the application software based on the acquired activated-application information.

Another object of the present invention is to provide the image processing apparatus, wherein the application-related screen is an operation screen that displays an operation key for a process associated with execution of functions related to the application software.

Another object of the present invention is to provide the image processing apparatus, wherein the image processing apparatus acquires application-related screen auxiliary information necessary for executing the process associated with the operation key displayed on the operation screen from the information processing apparatus.

Another object of the present invention is to provide the image processing apparatus, wherein the activated-application information includes application software name information.

Another object of the present invention is to provide the image processing apparatus, wherein if a plurality of pieces of the application software exists, the application-related screen is displayed on the displaying portion in accordance with a combination of the plurality of the applications based on the activated-application information.

Another object of the present invention is to provide the image processing apparatus, wherein the application software is remote conference software and wherein the application-related screen auxiliary information is information related to the other party of conference.

BRIEF DESCRIPTION OF THE DRAWINGS

FIGS. 12A and 12B are data configuration views of an example of an application-related screen display information table.

PREFERRED EMBODIMENTS OF THE INVENTION

Figure 1:
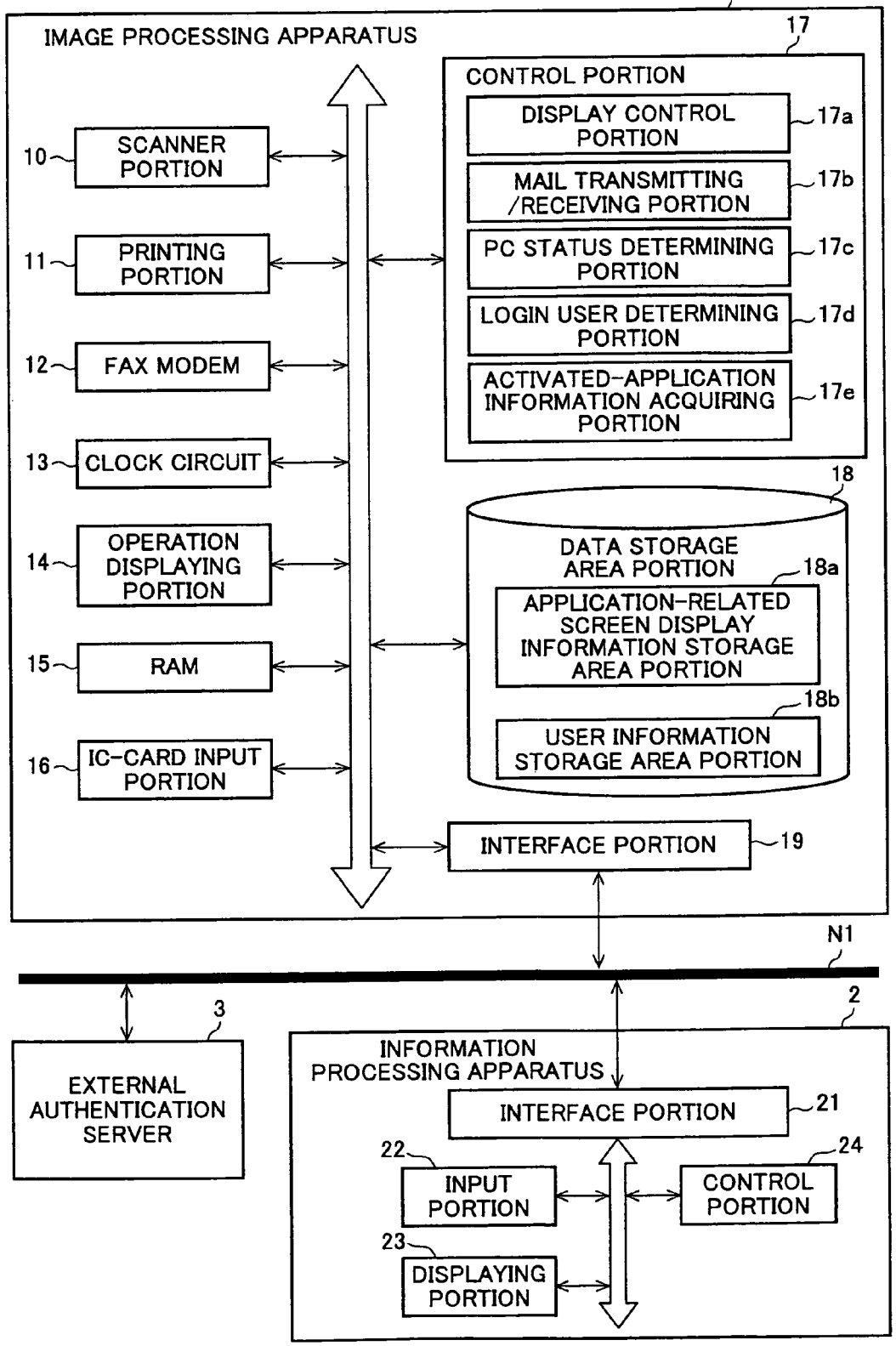
FIG. 1 is an explanatory block diagram of an exemplary configuration of a multi-function peripheral (MFP) to which an image processing apparatus of the present invention is applied.

An image processing apparatus of the present invention is configured as, for example, a multi-function peripheral, and preferably is used in an image processing system shown in FIG. 1. FIG. 1 is an explanatory block diagram of a configuration of an image processing apparatus of the present invention configured as a multi-function peripheral. In FIG. 1, 1 denotes a multi-function peripheral (hereinafter, MFP), and the MFP 1 includes a scanner portion 10, a printing portion 11, a FAX modem 12, a clock circuit 13, an operation displaying portion 14, a RAM 15, an IC-card input portion 16, a control portion 17, a data storage area portion 18, and an interface portion 19.

The MFP 1 of FIG. 1 is configured to include functions of a copier, a printer device, a facsimile device, and a scanner device and is communicatably connected through a network N1 to an information processing apparatus 2 such as PC and an external authentication server 3.

The control portion 17 included in the MFP 1 consists of a CPU executing calculations, a RAM having stored thereon temporary information associated with calculations, etc. The control portion 17 includes a ROM having stored thereon a control program for controlling the MFP 1.

The control portion 17 is connected to the scanner potion 10 that reads an image (document) recorded on a recording sheet to generate image data. The scanner portion 10 is provided with a CCD (Charge Coupled Device) for capturing a document image as image data, a document detection sensor that detects a document set on a document platform or an automatic document feeder (ADF), etc.

The control portion 17 is connected to the printing portion 11 acting as an image forming portion that forms image data on a recording sheet. The printing portion 11 forms and records image on a recording sheet from the image data temporarily stored on the RAM 15. Once the image data generated by the scanner portion 10 are stored onto the RAM 15, the MFP 1 can form an image with the printing portion 11. The MFP 1 functions as a copier in this way.

In FIG. 1, the control portion 17 is connected to the FAX modem 12 that performs the facsimile communication, and the FAX modem 12 is connected to a public line network (not shown). The MFP 1 can transmit the image data generated by the scanner portion 10 to another facsimile device through the facsimile communication via the public line network connected to the FAX modem 12. The MFP 1 can receive the image data transmitted from another facsimile device through the public line network with the FAX modem 12 to form an image from the received image data with the printing portion 11. The MFP 1 functions as a facsimile device in this way.

The control portion 17 is connected to the interface portion (a transmitting/receiving means) 19 for the MFP 1 transmitting/receiving information to/from the outside. The interface portion (hereinafter, I/F portion) 19 is connectable to a network N1 such as an in-house LAN, and the network N1 is connected with one or a plurality of the information processing apparatuses 2 operating in conjunction with the MFP 1, and the external authentication server 3 that is a server computer for performing the user authentication. In a normal state when the MFP 1 is operated alone, the I/F portion 19 is connected to the network N1 and exchanges information with the information processing apparatus 2 through the network N1. The network N1 is further connected to the internet and can communicate with external PCs, internet facsimile machines, etc.

The information processing apparatus 2 communicatably connected to the MFP 1 consists of a general-purpose personal computer (PC) having a CPU controlling the entire apparatus, storage devices such as a RAM that is a semiconductor memory, ROM, and HDD (Hard Disc Drive), an input device, a display device, a communication device, an output device, and a system bus, for example. The information processing apparatus (hereinafter, PC) 2 includes an interface portion 21, an input portion 22, a displaying portion 23, and a control portion 24. The control portion 24 consists of the CPU, the RAM, and the ROM and is connected to the input portion 22 and the displaying portion 23. Intermediate results of processes and processing results are presented to a user, etc., through the displaying portion 23 consisting of a display device such as LCD, and the user inputs and specifies information, etc., necessary for the processes from the input portion 22 consisting of a keyboard, a mouse (pointing device), etc. The PC 2 is connected to the interface portion 21 consisting of a network interface for connecting with various communication networks and, therefore, can communicatably be connected to the MFP 1.

When using this PC 2, a user turns on and activates the PC 2 and inputs user information associated with the user such as a user name and a password through the input portion 22 to login to the PC 2. The PC 2 may include an IC-card input portion as the input device and the user information may be input by reading an IC card having the user information written thereon with the IC-card input portion.

It is determined based on this user information whether the login is permitted. For example, the PC 2 has stored thereon a table (login table) that lists user information of users permitted to login, and the permission of login is determined based on whether the user information input to the PC 2 (input user information) is listed on the login table. Alternatively, the external authentication server 3 may store the login table; the PC 2 may transmit the input user information to the external authentication server 3; the external authentication server 3 may determine whether the received input user information is listed on the login table and transmit the determination result to the PC 2; and the PC 2 may determine the permission of login based on the determination result. If the login is permitted, i.e., if the user logs in to the PC 2, the user can use the PC 2.

The input user information used for login to the PC 2 is also used for the user authentication in the MFP 1. Therefore, after the login of the input user is permitted, if a user information acquisition (transmission) request is made from the MFP 1, the input user information is transmitted from the PC 2 to the MFP 1. The user information may be transmitted from the PC 2 to the MFP 1 when receiving an MFP activation signal indicating that the MFP 1 is activated or when a user is permitted to login.

The MFP 1 will further be described.

To the above PC 2, the MFP 1 can transmit the image data generated by the scanner portion 10 from the I/F portion 19. The MFP 1 functions as a scanner device in this way. The MFP 1 can also receive image data transmitted from the PC 2 with the I/F portion 19 to form an image from the received image data with the printing portion 11. The MFP 1 functions as a printer device in this way.

The control portion 17 is connected to IC-card input portion 16 that inputs IC cards for counting the number of prints for respective departments and the clock circuit 13 that clocks date and time. The control portion 17 generally controls the operation of the MFP 1 while referring to the time, etc., clocked by the clock circuit 13.

The control portion 17 is also connected to the data storage area portion 18 (hereinafter, storage portion) 18 such as a hard disc drive (HDD) having stored thereon the image data acquired by the scanner portion 10. The storage portion 18 has an application-related screen display information storage area portion (hereinafter, application-related screen display information storage portion) 18*a* and a user information storage area portion (hereinafter, user information storage portion) 18*b* as shown in FIG. 1. The application-related screen display information storage portion 18*a* is related to a display screen linking function that links display screens displayed on respective displaying portions of the MFP 1 and the PC 2, and the details thereof will be described later.

The user information storage portion 18*b* has stored thereon the user authentication information for authenticating a user permitted to use the MFP 1. It is preferred to list the user authentication information on a user authentication information table and to retain this user authentication information table on the user information storage portion 18*b*. The user authentication information table will be described in detail later. The user authentication information used for the user authentication is preliminarily set and registered in the MFP 1 by a user through the input portion of the operation displaying portion 14 described later, for example.

The storage portion 18 also has stored thereon the display data for displaying the operation screen (customized screen).

The control portion 17 is connected to the operation displaying portion 14 that accepts operations from a user. The operation displaying portion 14 consists of the input portion such as a touch panel or numeric keypad that inputs information such as control instructions through user's operation and the displaying portion such as a liquid crystal panel that displays the operation screen and the information necessary for operations. In the input portion of the operation displaying portion 14, user information setup and customized screen setup can be performed along with the function instructing operations.

The control portion 17 is connected as above and also has a display control portion 17*a*, a mail transmitting/receiving portion 17*b*, a PC status determining portion 17*c*, a login user determining portion 17*d*, and an activated-application information acquiring portion 17*e*. The activated-application information acquiring portion 17*e* is related to the display screen linking function and will be described in detail later.

The PC status determining portion 17*c* determines a status of the PC 2 and determines that the PC 2 is activated and that a user logs out from the PC 2.

For example, when receiving from the PC 2 the activation acknowledgment signal indicating that the PC 2 is activated, the PC status determining portion 17*c* determines that the PC 2 is activated. The activation acknowledgment signal from the PC 2 is transmitted if the PC 2 has been activated when the MFP 1 queries the PC 2 whether the PC 2 is activated. The activation acknowledgment signal may be transmitted at the time of activation of the PC 2.

For example, when receiving the logout signal indicating that a user logs out from the PC 2, the PC status determining portion 17*c* determines that the user logs out from the PC 2. The logout signal from the PC 2 is transmitted if the user has logged out from the PC 2 when the MFP 1 queries the PC 2 whether the user logs out from the PC 2. The logout signal may be transmitted when the user performs the logout operation for the PC 2.

The login user determining portion 17*d* performs the authentication (user authentication) of a user logging in to the PC 2 (PC login user) for the MFP 1, acquires user information associated with the PC login user, and determines whether the PC login user is a user permitted to use the MFP 1 (MFP usage permitted user) to decide the MFP usage permitted user. The login user determining portion 17*d* receives the input user information such as a user name and a password of the PC login user through the I/F portion 19 to perform the user authentication based on the received input user information (received user information) and the user authentication information stored in the user information storage portion 18*b*.

The user authentication in the MFP 1 can also be performed as external authentication using the external authentication server 3 connected through the network instead of the above internal authentication performed by referring to the user authentication information stored in the user information storage portion 18b in the MFP 1. In the case of the user authentication performed as external authentication (user external authentication), for example, first, the MFP 1 transmits the received user information (user name and password) to the external authentication server 3 having stored thereon the user authentication information same as that stored in the user information storage portion 18b. The external authentication server 3 performs the user authentication based on the received user information received from the MFP 1 and the above user authentication information and returns success of authentication or failure of authentication to the MFP 1.

The authentication mode used for the user authentication in the MFP 1 may preliminarily be set in the MFP 1. In such a case that a user desires the login permission determination using the external authentication server when the user logs in to the PC 2, the external authentication may be performed on the basis of determination that the user desires to perform the user authentication in the MFP 1 as the external authentication and, in this case, the PC 2 transmits to the MFP 1 the user information indicating that the external authentication modes are selected, along with the user name and the password.

In some cases, different pieces of user information are set for the same user at the time of login to the PC 2 and at the time of user authentication in the MFP 1 (e.g., user information in the login table may be different from user information in the user authentication information table for that user). In preparation for such a case, the MFP 1 may include a user information converting portion that converts the user information used for the login to the PC 2 into the user information for the user authentication in the MFP 1. The PC 2 may include a similar user information converting portion to transmit the converted user information to the MFP 1.

As a result of the user authentication as the internal authentication or external authentication, if the authentication is successful (the PC login user is the MFP usage permitted user), the MFP 1 displays the customized screen of the authenticated user on the displaying portion of the operation displaying portion 14.

Figure 2:
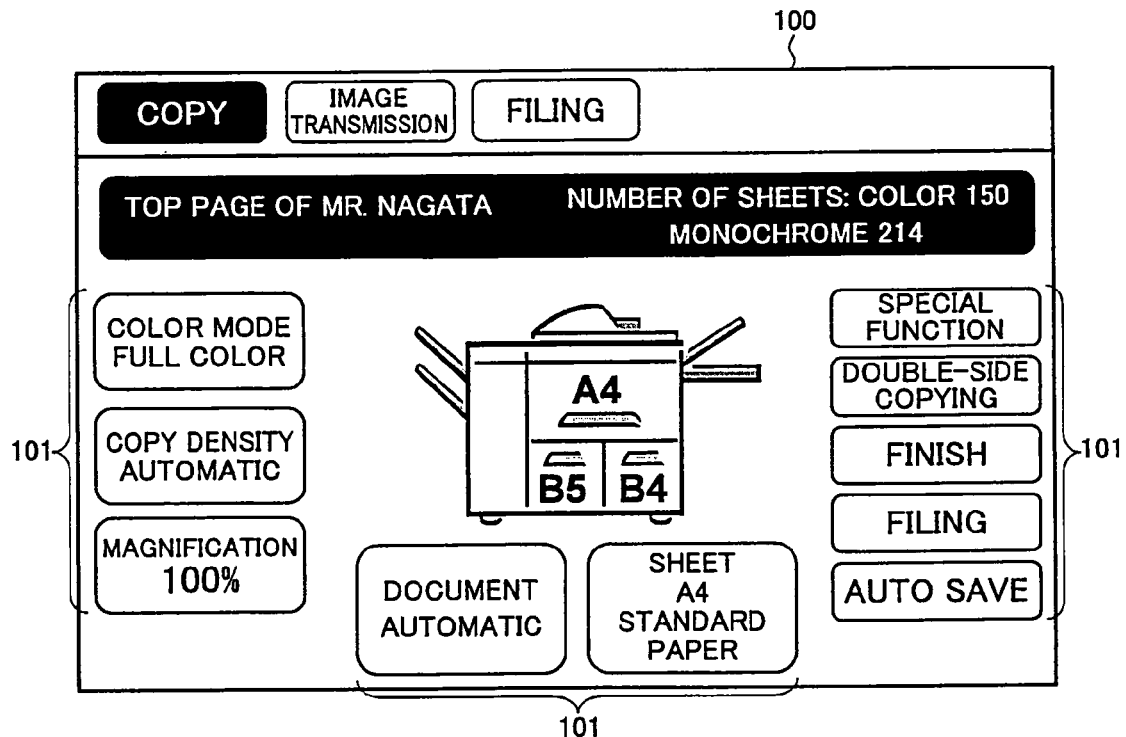
FIG. 2 depicts an example of a customized screen displayed on a displaying portion of the MFP of the present invention.

The customized screen displayed on the displaying portion of the MFP 1 is, for example, a TOP screen (TOP page) initially displayed on the displaying portion when the user authentication is successful, and an example thereof is shown in FIG. 2.

The MFP 1 enables, for example, "copy" operation using the copy function, "image transmission" operation and "filing" operation using the scanner function and can display operation screens corresponding to the respective operations. FIG. 2 shows a customized screen (TOP page) 100 customized by a user such that the operation screen for the "copy" operation is displayed, and the customized screen 100 displays various setting keys 101 such as "color mode" and "copy density".

As above, the display data for displaying the operation screen is stored in the storage portion 18, for example. The customized-screen display information is also stored in the storage portion 18 for each user for displaying the above customized screen based on the display data. For example, the customized-screen display information may be listed for each MFP usage permitted user on the user authentication information table listing the user information. The user authentication information table will be described later.

In the MFP 1 storing the information/data for the customized-screen display as above, the customized screen is displayed after the user authentication by referring to the storage portion 18 and generating the customized screen based on the customized-screen display information and the display data of the user corresponding to the received user information.

The user (MFP usage permitted user) can customize (change setting of) the customized screen through the operation displaying portion 14, etc., and, for example, the operation screen for the "image transmission" operation can be displayed as the TOP screen instead of the operation screen 100 for the "copy" operation of FIG. 2, or a certain key (e.g., the setting key of FIG. 2) can be hidden. If the setting of the customized screen is changed, the corresponding customized-screen display information is changed that is stored in the storage portion.

In the MFP 1 displaying the customized screen of the authenticated user after the user authentication as above, if it is identified that the PC login user logs out from the PC 2, the user authentication is accordingly canceled in the MFP 1. That is, the MFP 1 is put into the logout state. The MFP 1 also cancels the display of the customized screen and displays a predetermined screen instead. The predetermined screen is an operation screen that may be displayed for all users regardless of whether a user is the MFP usage permitted user and is a so-called default screen, for example.

Figure 3:
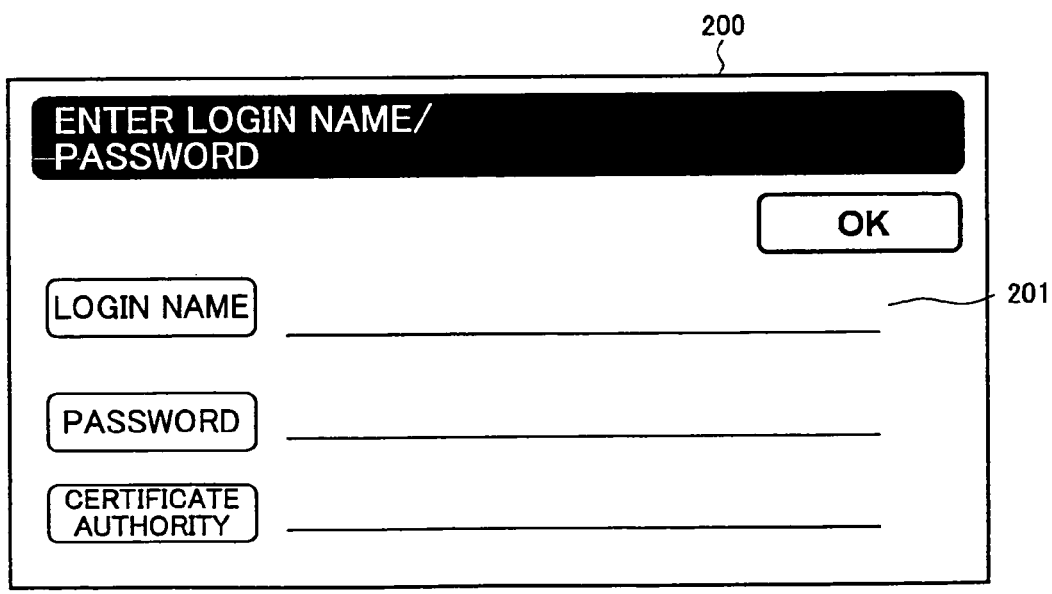
FIG. 3 depicts an example of an initial screen displayed on the displaying portion of the MFP of the present invention.

FIG. 3 shows an example of a default screen displayed on the displaying portion of the MFP. A default screen 200 of FIG. 3 displays input fields 201 for entering a login name, etc.

The user authentication information table will then be described.

Figure 4:
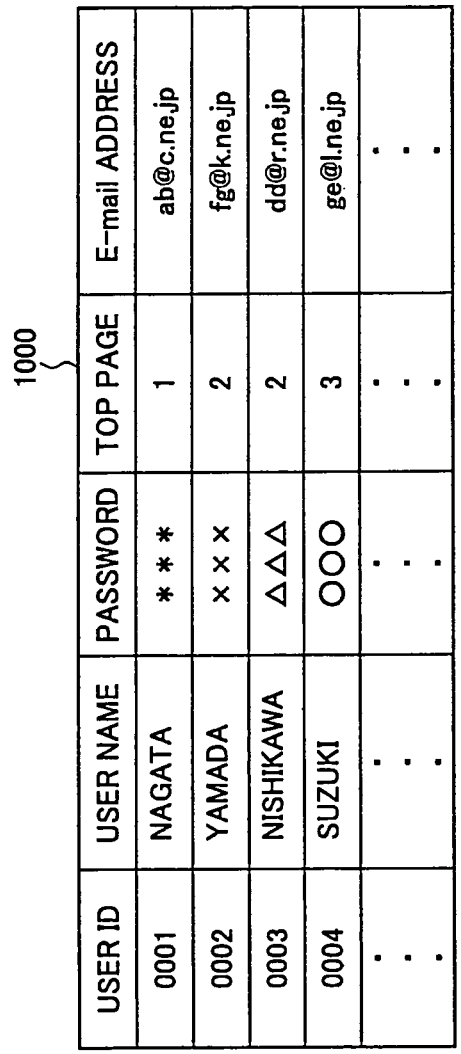
FIG. 4 is a data configuration view of an example of a user authentication table.

FIG. 4 shows an exemplary configuration of the user authentication information table. A user authentication information table 1000 lists user information, such as user names and passwords, and user IDs of MFP usage permitted users, for example. The login user determining portion of the MFP 1 performs the user authentication depending on whether the received user information (the user name and the password of the PC login user) is listed on the user authentication information table and is identical to that listed on the user authentication information table.

The user authentication information table lists TOP page information, which is an example of the customized-screen display information, correlated with the user information. In the user authentication information table 1000 of FIG. 4, for example, "1", "2", and "3" are customized-screen display information for displaying the operation screens for the copy operation, the image transmission operation, and the filing operation, respectively, as the customized screen. In the user authentication information table 1000, since the user information consisting of "user name"="Nagata" and "password"="*" is correlated and listed with the TOP page information "1", if the received user information is "user name"="Nagata" and "password"="*", the MFP 1 authenticates the user as the MFP usage permitted user and displays the customized screen 100 shown in FIG. 2.

It is preferable to list e-mail addresses for each MFP usage permitted user on the user authentication information table.

The external authentication server 3 may retain the user information table, or the external authentication server 3 may include a part corresponding to the user information storage portion 18b. In such a case, the external authentication server may return data/information associated with a successfully authenticated user (specifically, TOP page information of the user) instead of the success of authentication.

A process for displaying the customized screen in the image processing system including the MFP 1 configured as above will then be described with reference to FIG. 5. In this example, the MFP 1 is already turned on.

After the PC 2 is turned on and activated, when a user inputs a user name and a password through the input portion 22 and certain user's login is identified (step S1, YES), the user name and the password input through the input portion 22 are transmitted to the MFP 1 connected through the network. The MFP 1 acquires the user name and the password input to the PC 2 through the network (step S2) and determines in the authentication mode whether the PC login user can be authenticated by the MFP 1.

The authentication mode includes the external authentication mode and the internal authentication mode, and in the case of the internal authentication mode (step S3, internal authentication mode), it is determined whether the user authentication information stored in the storage portion 18 of the MFP 1 includes the input user information (user name and password) acquired at step S2. If included, i.e., if the authentication can be performed in the internal authentication mode (step S4, YES), the MFP 1 is put into the login state with the acquired input user information (step S5). The displaying portion of the MFP 1 automatically displays the customized screen (TOP screen) of the user corresponding to the input user information (step S6).

When the user subsequently logs out from the PC 2 (step S7, YES), the MFP 1 is put into the logout state (step S8). The display of the customized screen, etc., is canceled and the displaying portion of the MFP 1 displays the default screen 200 shown in FIG. 3 (step S9).

On the other hand, in the case of the external authentication mode (step S3, external authentication mode), the MFP 1 first transmits the input user information (user name and password) received from the PC 2 to the external authentication server 3 (step S10). The external authentication server 3 determines whether the user authentication information stored in the server 3 includes the input user information (user name and password) received at step S10. If included, i.e., if the authentication can be performed in the external authentication mode (step S11, YES), the process goes to step S5 and the MFP 1 is put into the login state with the input user information acquired from the PC 2.

If it is unable to perform the internal authentication (step S4, NO) or the external authentication (step S11, NO), the MFP 1 goes to step S9 and the displaying portion of the MFP 1 automatically displays the default screen 200 (see FIG. 3) same as that displayed at the time of power-on of the MFP 1.

According to the MFP of the present invention, if it is identified that a user logs in to a linked PC, the operation screen customized for the user is automatically displayed on the displaying portion of the MFP and, therefore, the burden of the user logging in to the MFP can be alleviated.

According to the MFP of the present invention, if it is identified that a user logs out from a linked PC, the MFP is automatically logged out and, therefore, the logout process can be performed at suitable timing.

The display screen linking function included in the MFP of the present invention will then be described.

If the operation screen displayed on the operation panel of the MFP can be switched in conjunction with the display operation of the linked PC in addition to automatically displaying on the MFP's displaying portion the MFP customized screen for the user logged in to the PC communicatably connected to the MFP, i.e., if the MFP includes the display screen linking function, user assistance can be provided for more general purpose.

Therefore, the MFP 1 of FIG. 1 can determine application software activated in the PC 2 (i.e., application soft displayed on the displaying portion 23) and display the operation screen corresponding to the activated application software on the displaying portion of the MFP 1 to enable the display screen linking function. Specifically, this is achieved by configuring the MFP 1 such that the control portion 17 and the storage portion 18 include the following activated-application information acquiring portion 17e and the application-related screen display information storage portion 18a, respectively.

The activated-application information acquiring portion 17e acquires activated-application information that is information about application software activated on the PC 2.

The application-related screen display information storage portion 18a stores and correlates with application information the application-related screen display information for displaying an application-related screen that is an operation screen related to application software.

The MFP 1 displays the application-related screen on the own displaying portion based on the activated-application information acquired by the activated-application information acquiring portion 17e, the application-related screen display information stored in the application-related screen display information storage portion 18a, etc.

Several embodiments of the MFP of the present invention including the display screen linking function will hereinafter be described with examples of the application-related screen displayed on the MFP according to the embodiments.

First Embodiment

Figure 6:
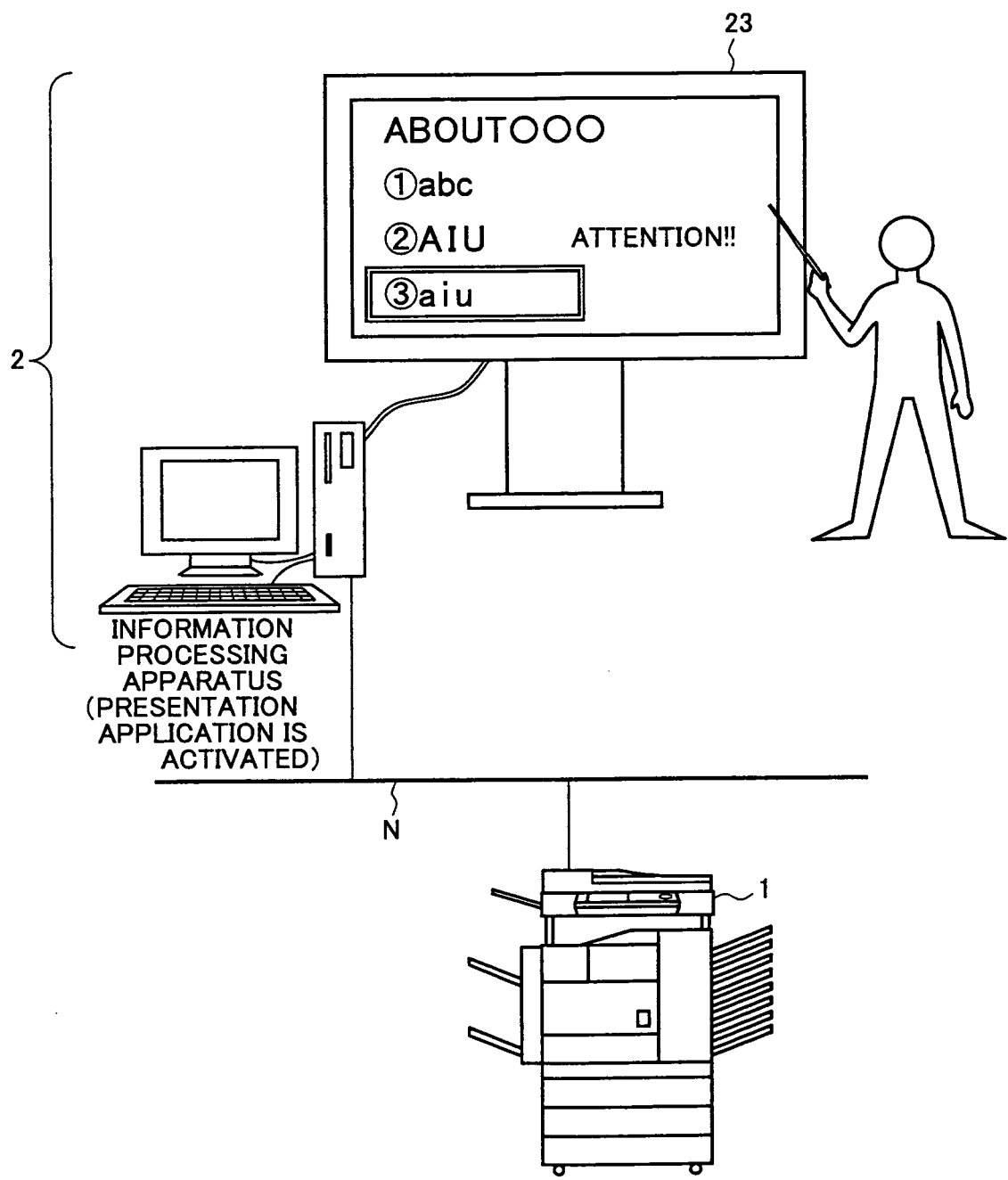
FIG. 6 is an explanatory system schematic view of the MFP according to one embodiment of the present invention.

FIG. 6 is an explanatory system schematic view of the MFP according to one embodiment of the present invention, and the MFP 1 is connected through the network N1 to the PC 2 having the large-size displaying portion 23. On the PC 2 of FIG. 6, application software called "presentation application" categorized as presentation software is activated, and the displaying portion 23 of the PC 2 displays a screen of the presentation software "presentation application". In this case, the activated-application information acquiring portion 17e of the MFP 1 acquires the activated-application information, for example, the type of the activated application software "presentation software" and the name of the activated application software "presentation application", through the network N1 from the PC 2. The MFP 1 generates the application-related screen corresponding to the acquired activated-application information with reference to the application-related screen display information storage portion 18a and displays the application-related screen on the own displaying portion (touch panel).

Figure 7:
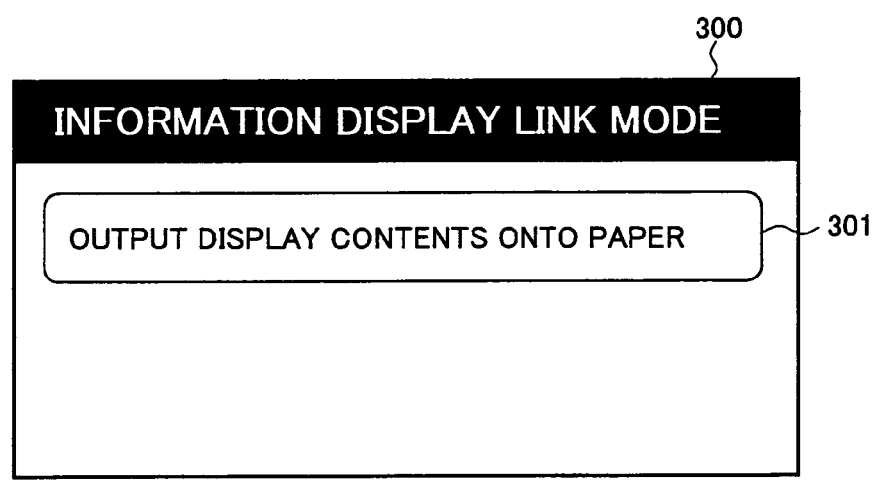
FIG. 7 depicts an application-related screen displayed on the displaying portion of the MFP of FIG. 6.

FIG. 7 shows an example of the application-related screen in the example of FIG. 6. An application-related screen 300 displayed on the displaying portion of the MFP 1 is linked to the display screen displayed on the displaying portion 23 of the PC 2 and is an operation screen corresponding to the display screen of the application software "presentation application" activated on the PC 2, which is displayed on the displaying portion 23 of the PC 2. The application-related screen 300 displays an operation key for causing the MFP 1 to perform a predetermined operation associated with the application software activated on the PC 2, i.e., an operation key 301, which is "OUTPUT DISPLAY CONTENTS ONTO PAPER". When a user presses down the operation key 301, the predetermined operation is correspondingly performed by the MFP 1, etc., and the contents displayed on the displaying portion 23 of the PC 2 are printed and output on recording paper by the MFP 1.

Second Embodiment

Figure 8:
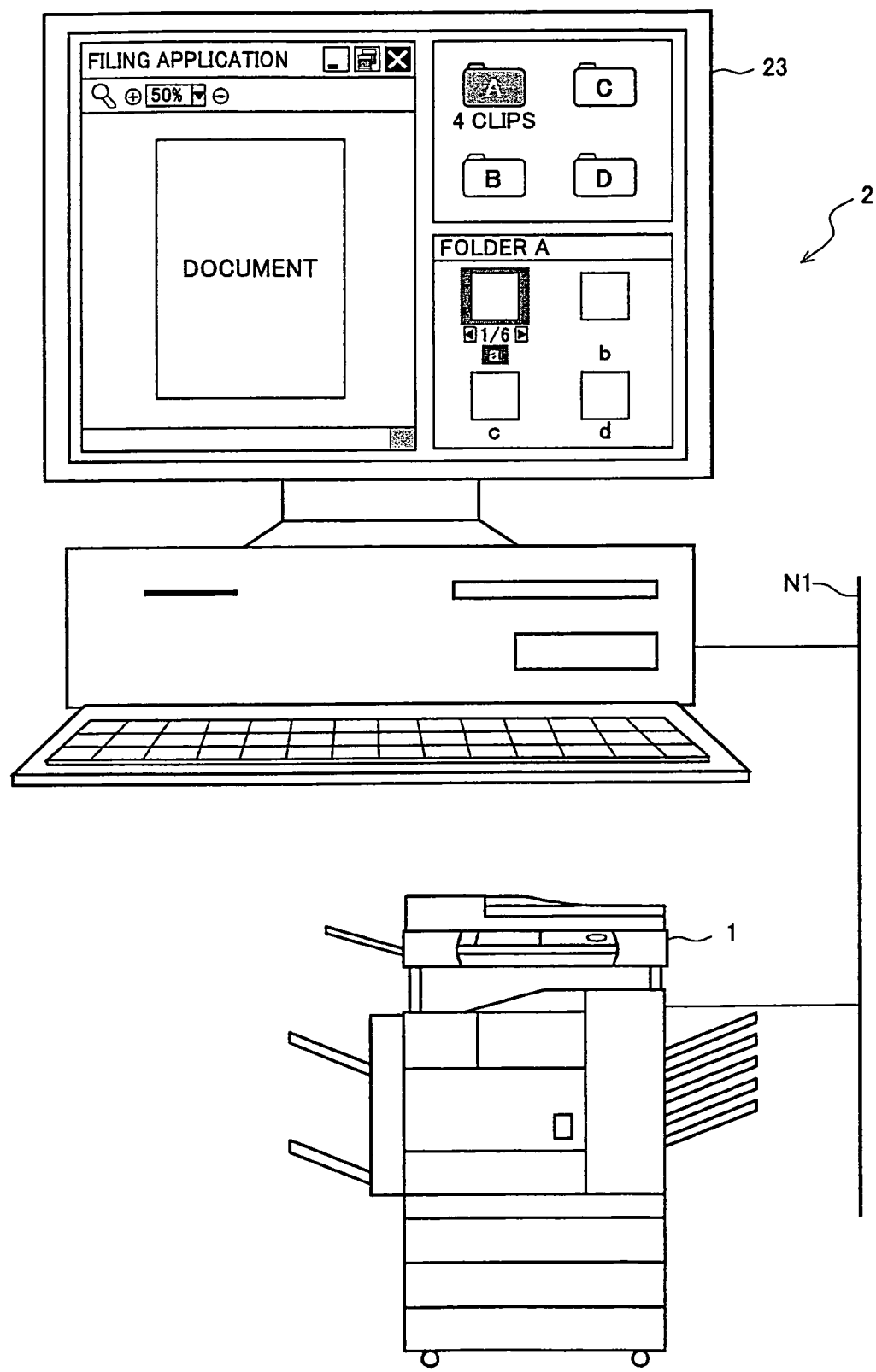
FIG. 8 is an explanatory system schematic view of the MFP according to another embodiment of the present invention.

FIG. 8 is an explanatory system schematic view of the MFP according to another embodiment of the present invention, and the MFP 1 is connected through the network N1 to the PC 2 having the displaying portion 23. On the PC 2 of FIG. 8, application software called "filing application" categorized as filing software is activated, and the displaying portion 23 of the PC 2 displays a screen of the filing software "filing application". In this case, the activated-application information acquiring portion 17e of the MFP 1 acquires the activated-application information, for example, the type of the activated application software "filing software" and the name of the activated application software "filing application", through the network N1 from the PC 2. The MFP 1 generates the application-related screen corresponding to the acquired activated-application information with reference to the application-related screen display information storage portion 18a and displays the application-related screen on the own displaying portion (touch panel).

Figure 9:
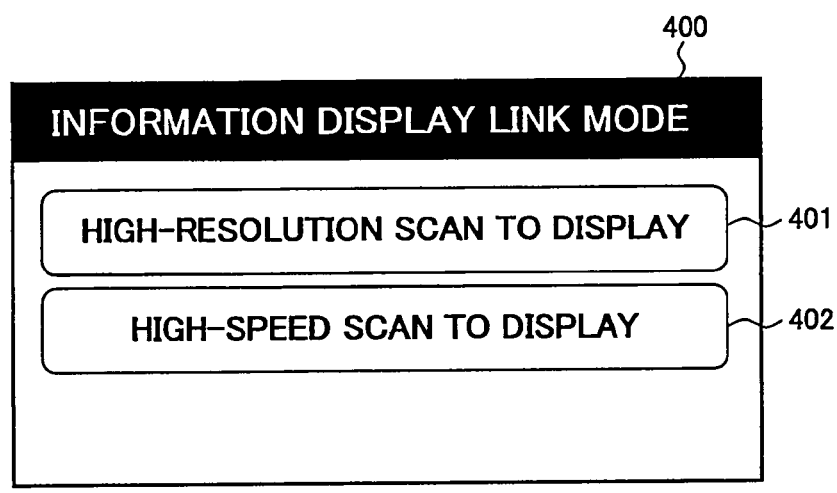
FIG. 9 depicts an application-related screen displayed on the displaying portion of the MFP of FIG. 8.

FIG. 9 shows an example of the application-related screen in the example of FIG. 8. An application-related screen 400 displayed on the displaying portion of the MFP 1 is an operation screen corresponding to the display screen of the application software "filing application" activated on the PC 2, which is displayed on the displaying portion 23 of the PC 2. The application-related screen 400 displays operation keys, i.e., operation keys 401 and 402, which are "HIGH-RESOLUTION SCAN TO DISPLAY" and "HIGH-SPEED SCAN TO DISPLAY". When a user presses down the operation key 401, a predetermined operation is correspondingly performed by the MFP 1, etc., and the displaying portion 23 of the PC 2 displays an image of document captured at a high resolution such as 1200-by-1200 dpi with the user of the scanner function of the MFP 1. Alternatively, when a user presses down the operation key 402, the displaying portion 23 of the PC 2 displays an image of document quickly captured at a resolution such as 200-by-200 dpi with the use of the scanner function of the MFP 1.

Third Embodiment

Figure 10:
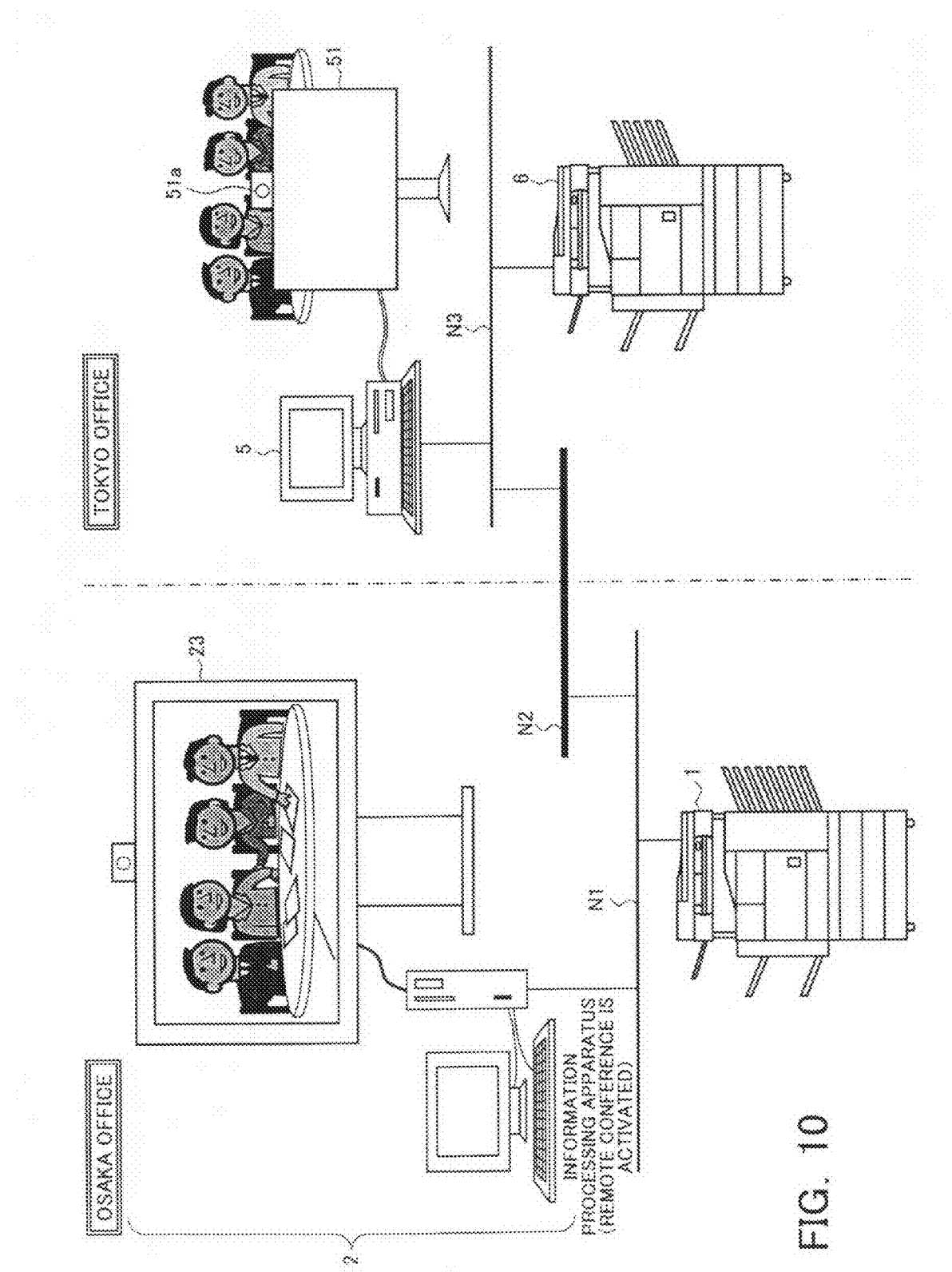
FIG. 10 is an explanatory system schematic view of the MFP according to another embodiment of the present invention.

FIG. 10 is an explanatory system schematic view of the MFP according to another embodiment of the present invention, and in the example of FIG. 10, remote conference application is used at an Osaka office and a Tokyo office to establish a remote conference (TV conference) system. In the Osaka office, the MFP 1 is connected through the network N1 to the PC 2 having the displaying portion 23. The network N1 of the Osaka office is connected to a network N3 of the Tokyo office through a wide area network N2 such as the internet. An MFP 6 and an information processing apparatus (PC) 5 are connected through the network N3 and the PC 5 includes a displaying portion 51 equipped with a video camera 51a shooting the status in the conference room of the Tokyo office.

On the PC 2 of the Osaka office of FIG. 10, application software called "remote conference" categorized as remote conference software is activated, and the displaying portion 23 of the PC 2 displays a screen of the remote conference software "remote conference" to display the status in the conference room of the Tokyo office shot by the video camera 51a (similar operations are also performed for the PC 5 of the Tokyo office). In this case, the activated-application information acquiring portion 17e of the MFP 1 acquires the activated-application information, for example, the type of the activated application software "remote conference software" and the name of the activated application software "remote conference", through the network N1 from the PC 2. The MFP 1 generates the application-related screen corresponding to the acquired activated-application information with reference to the application-related screen display information storage portion 18a, etc., and displays the application-related screen on the own displaying portion (touch panel).

Figure 11:
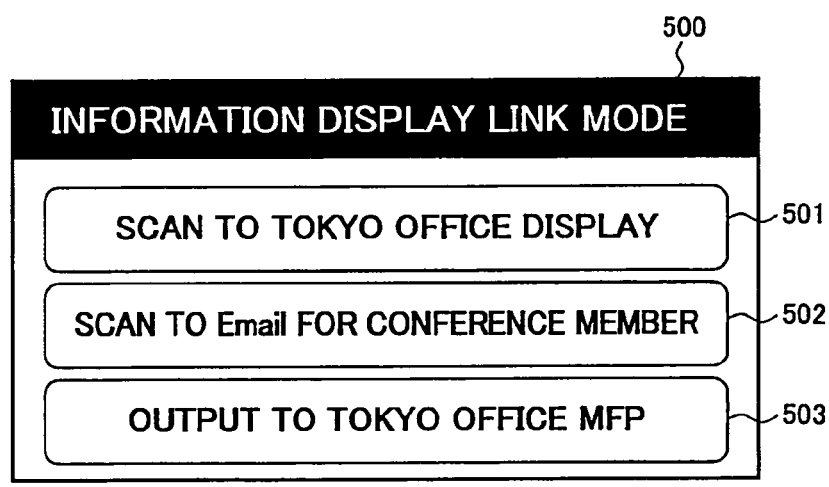
FIG. 11 depicts an application-related screen displayed on the displaying portion of the MFP of FIG. 10.

FIG. 11 shows an example of the application-related screen in the example of FIG. 10. An application-related screen 500 displayed on the displaying portion of the MFP 1 is an operation screen corresponding to the display screen of the application software "remote conference" activated on the PC 2, which is displayed on the displaying portion 23 of the PC 2. The application-related screen 500 displays operation keys, i.e., operation keys 501, 502, and 503, which are "SCAN TO TOKYO OFFICE DISPLAY", "SCAN TO EMAIL FOR TOKYO OFFICE MEMBER", AND "OUTPUT TO TOKYO OFFICE MFP".

When a user presses down the operation key 501, a predetermined operation is correspondingly performed by the MFP 1, etc., and the displaying portion 51 of the PC 5 of the Tokyo office displays an image of document captured with the use of the scanner function of the MFP 1. When a user presses down the operation key 502, an image of document captured with the use of the scanner function of the MFP 1 is transmitted to an e-mail address of a user logged in to the PC 5 of the Tokyo office. When a user presses down the operation key 503, an image of document captured with the use of the scanner function of the MFP 1 is transmitted to the MFP 6 of the Tokyo office, and the MFP 6 is instructed to print out the image.

To attain the above display screen linking function, the MFP according to the present invention correlates and stores the application-related screen display information for displaying the application-related screen and the application information with each other in the application-related screen display information storage portion 18a as described above. For example, this is implemented by storing an application-related screen display information table having the application-related screen display information registered for each piece of the application information in the application-related screen display information storage portion 18a.

The application-related screen display information table will then be described.

FIGS. 12A and 12B depict exemplary configurations of the application-related screen display information table. For example, as shown in FIG. 12A, the application-related screen display information table lists application names (in "application" fields) as the application information and lists operation-key display information (in "display information 1", "display information 2", and "display information 3" fields) for displaying the operation keys as the application-related screen display information. The application-related screen display information table also lists acquisition-required information (in "parameter 1" and "parameter 2" fields) that is application-related screen auxiliary information (parameters) necessary for executing the process related to the operation keys displayed on the application-related screen and required to be acquired from the information processing apparatus. The application-related screen auxiliary information is also used when the application-related screen is displayed on the displaying portion of the MFP 1.

For example, if the activated-application information acquiring portion 17e acquires "presentation application" as the activated application name from the PC 2, the application-related screen display information corresponding to this information is the operation-key information of "OUTPUT DISPLAY CONTENTS ONTO PAPER". Since no more parameter is needed (NULL) for this application-related screen display information based on the application-related screen display information table, the MFP 1 displays the application-related screen 300 (see FIG. 6) based on the application-related screen display information, etc., without acquiring a parameter.

For example, if the activated-application information acquiring portion 17e acquires "remote conference" as the activated application name from the PC 2, the application-related screen display information corresponding to this information is the operation-key information of "SCAN TO OTHER PARTY", "SCAN TO EMAIL FOR CONFERENCE MEMBER", AND "OUTPUT TO OTHER PARTY MFP". Since parameters of "OTHER PARTY" and "CONFERENCE MEMBER ID" are also necessary for this application-related screen display information based on the application-related screen display information table, the MFP 1 requests and acquires these parameters from the PC 2 and displays the application-related screen 500 (see FIG. 10) based on the application-related screen display information, these parameters, etc.

If the operation key of "SCAN TO EMAIL FOR CONFERENCE MEMBER" is pressed down on the application-related screen 500, the MFP 1 decides a destination e-mail address based on the acquired parameter (conference member ID) and creates and transmits a mail with a scanned image attached.

Although the MFP of the above examples displays on the displaying portion of the MFP the operation screen corresponding to a single piece of application software activated on the PC connected through the network, the MFP may display the operation screen corresponding to a plurality of pieces of application software activated on the PC (e.g., a combination of pieces of application software).

In this case, preferably, the table stored in the storage portion lists the application-related screen display information in accordance with the combinations. FIG. 12B shows an example of the application-related screen display information table for a plurality of pieces of application software.

Figure 13:
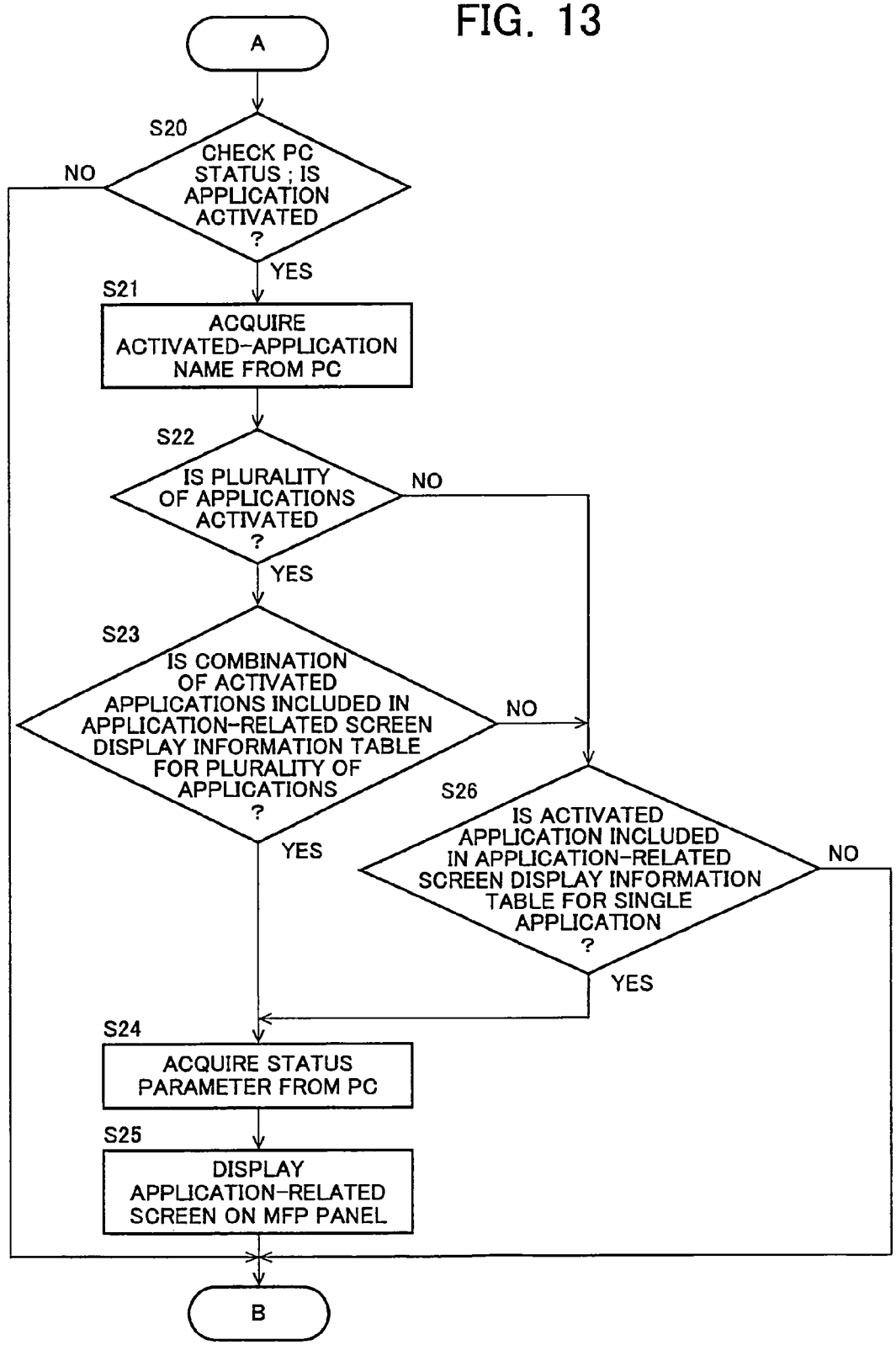
FIG. 13 is an explanatory flowchart of an application-related screen display process in the MFP of the present invention.

Description will then be made of a process for displaying the application-related screen while the MFP 1 is powered on in the image processing system including the MFP 1 configures as above with reference to FIG. 13.

When the displaying portion of the MFP 1 displays the customized screen and the user does not log out from the PC 2 (step S7 of FIG. 5, NO), the MFP 1 determines whether application software is activated on the PC 2 (step S31). For example, if the MFP 1 requests the PC 2 to transmit the activated-application information and the application information is transmitted to the MFP 1, it is determined that application software is activated on the PC 2.

If application software is activated on the PC 2 (step S20, YES), the activated-application information acquiring portion 17e of the MFP 1 acquires the activated-application information (application name information) through the I/F portion 19, etc., from the PC 2 (step S21). It is then determined based on the acquired activated-application information whether a plurality of applications is activated (step S22). For example, if a plurality of pieces of application name information is acquired, it is determined that a plurality of pieces of application software is activated on the PC 2.

If a plurality of pieces of application software is activated (step S22, YES), it is determined with reference to the application-related screen display information table for a plurality of applications whether the table includes a combination of the plurality of pieces of the activated application software (step S23). If included (step S23, YES), it is determined whether the application-related screen auxiliary information (parameter) must be acquired for the combination from the PC 2. For example, the determination is made depending on whether the acquisition-required information is listed for the combination on the table.

If a parameter must be acquired from the PC 2, the activated-application information acquiring portion 17e of the MFP 1 acquires the parameter through the I/F portion 19, etc., from the PC 2 (step S24). The application-related screen is generated based on the acquired information and the application-related screen display information corresponding to the activated-application information and is displayed on the displaying portion of the MFP 1 (step S25), and the process goes back to S7 of FIG. 5.

If a plurality of pieces of application software is not activated (step S22, NO) or if a combination of a plurality of pieces of the activated application software is not included in the application-related screen display information table for a plurality of applications (step S23, NO), the application-related screen display information table for single application is referenced.

If the acquired activated-application information is included in the application-related screen display information table for single application (step S26, YES), it is determined whether the application-related screen auxiliary information (parameter) must be acquired for the application software from the PC 2, and the process goes to step S24. If the acquired activated-application information is not included in the application-related screen display information table for single application (step S26, YES), the process goes to step S7 of FIG. 5.

Figure 5:
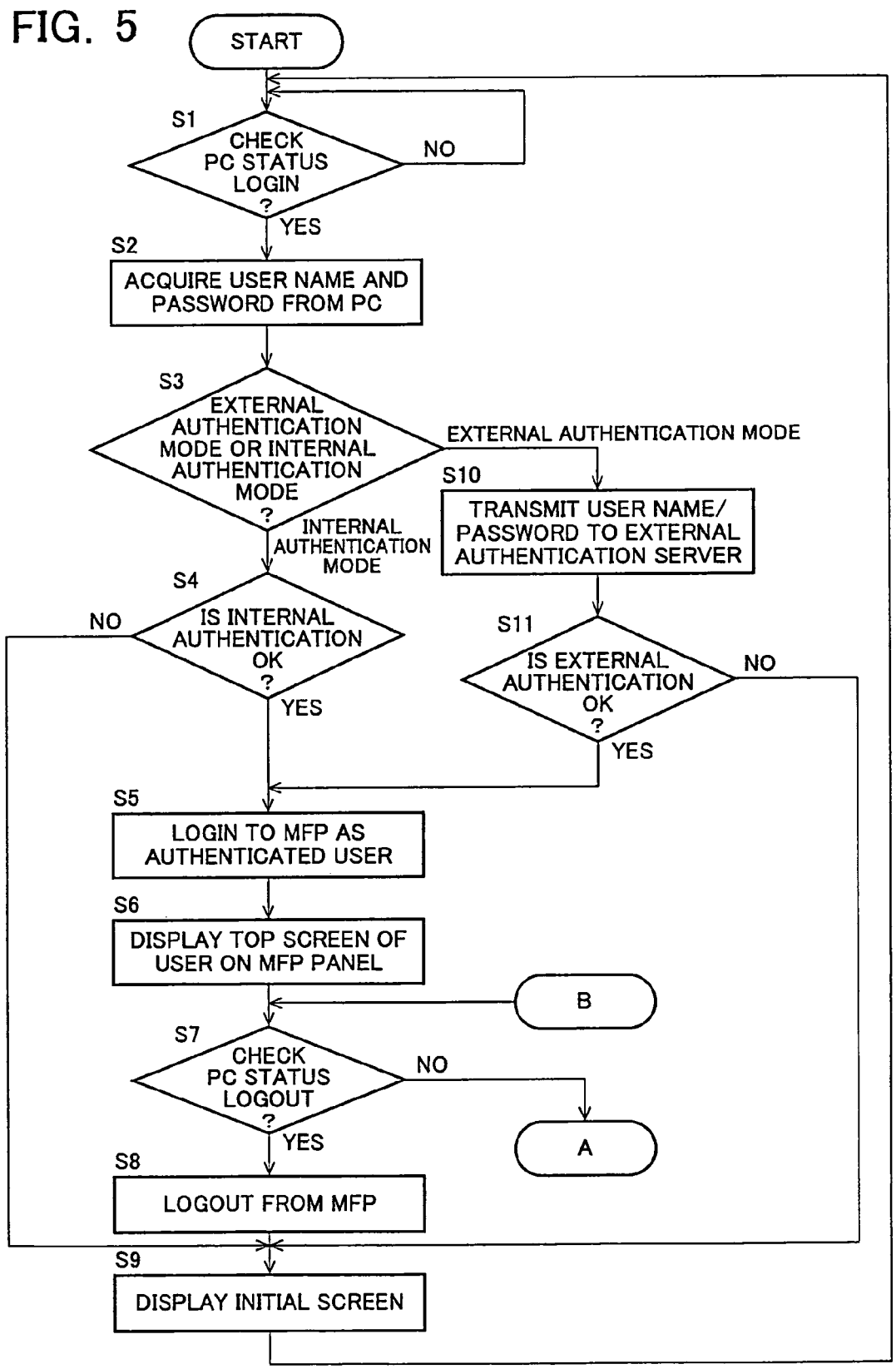
FIG. 5 is an explanatory flowchart of a customized-screen displaying process in the MFP of the present invention.

If it cannot be determined that the application is activated (step S20, NO), the process also goes to step S7 of FIG. 5.

According to the MFP of the present invention, since the operation screen corresponding to application software is displayed, the number of steps can be reduced in the button operation on the operation displaying portion (operation panel) of the multi-function peripheral; the user's operational burden can be alleviated; and user's input can be assisted in the multi-function peripheral.

Since the operation screen corresponding to application software and parameters (such as work folder information and TV conference party information) is displayed, switching can be performed based on user's usage scenes; the number of steps can be reduced in the button operation on the operation panel of the multi-function peripheral; and the user's operational burden can be alleviated.

According to the present invention, since user information is acquired that is input to the information processing apparatus operating in conjunction with the image processing apparatus and a user's customized screen is displayed based on the acquired user information, the user's customized screen can be displayed automatically on the displaying portion of the image processing apparatus without user's input operation to the image processing apparatus, and the burden of the user performing the input operation to the image processing apparatus can be alleviated.

The invention claimed is:

1. An image processing apparatus communicably connected to an information processing apparatus via a network, the image processing apparatus comprising:
a displaying portion; and
a controller including a processor that acquires user information related to a login user who has logged in remotely via the information processing apparatus,
wherein the controller of the image processing apparatus authenticates the login user based on the acquired user information, and determines whether the login user is a usage permitted user who is permitted to use the image processing apparatus, when the login user is authenticated as the usage permitted user, the image processing apparatus displays a customized screen corresponding to the login user on the displaying portion; and the image processing apparatus acquires activated-application information related to application software activated on the information processing apparatus and displays on the displaying portion an application-related screen having an operation key that is a soft key arranged on a touch screen of the displaying portion, the operation key corresponding to the application software based on the acquired activated-application information such that when the login user depresses the operation key of the application-related screen displayed on the displaying portion of the image processing apparatus, a corresponding operation is performed on the image processing apparatus.

2. The image processing apparatus as defined in claim 1, wherein the image processing apparatus is communicably connected to an external authentication server that authenticates whether the login user is the usage permitted user, and wherein the image processing apparatus transmits the acquired user information to the external authentication server, receives from the external authentication server an authentication result of whether the login user is the usage permitted user, and performs the authentication based on the acquired user information on the basis of the received authentication result.

3. The image processing apparatus as defined in claim 1 or 2, wherein the image processing apparatus has a user authentication information table listing user authentication information and refers to the user authentication information table to perform the authentication based on the acquired user information.

4. The image processing apparatus as defined in claim 3, wherein the user authentication information table lists an e-mail address for each user.

5. The image processing apparatus as defined in claim 3, wherein the user authentication information table lists display information for displaying a customized screen for each user.

6. The image processing apparatus as defined in claim 1 or 2, wherein it is determined whether the login user logs out from the information processing apparatus and wherein if it is determined that the login user logs out from the information processing apparatus, the image processing apparatus puts itself into a logout state to display a default screen on the displaying portion.

7. The image processing apparatus as defined in claim 1, wherein the application-related screen is an operation screen that displays an operation key for a process associated with execution of functions related to the application software.

8. The image processing apparatus as defined in claim 7, wherein the image processing apparatus acquires application-related screen auxiliary information necessary for executing the process associated with the operation key displayed on the operation screen from the information processing apparatus.

9. The image processing apparatus as defined in claim 1, wherein the activated-application information includes application software name information.

10. The image processing apparatus as defined in claim 1, wherein if a plurality of pieces of the application software exists, the application-related screen is displayed on the displaying portion in accordance with a combination of the plurality of the applications based on the activated-application information.

11. The image processing apparatus as defined in claim 8, wherein the application software is remote conference software and wherein the application-related screen auxiliary information is information related to the other party of conference.

* * * * *